(12) United States Patent
Sambandan (10) Patent No.: US 11,604,731 B2
(45) Date of Patent: Mar. 14, 2023

(54) SYSTEMS AND METHODS FOR MAINTAINING CACHE COHERENCY

(71) Applicant: Seagate Technology LLC, Fremont, CA (US)

(72) Inventor: Sivakumar Sambandan, Pune (IN)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/129,863

(22) Filed: Dec. 21, 2020

(65) Prior Publication Data

US 2022/0197802 A1   Jun. 23, 2022

(51) Int. Cl.
*G06F 12/08* (2016.01)
*G06F 13/40* (2006.01)
*G06F 12/0815* (2016.01)

(52) U.S. Cl.
CPC ...... *G06F 12/0815* (2013.01); *G06F 13/4027* (2013.01); *G06F 2212/1032* (2013.01)

(58) Field of Classification Search
CPC ............. G06F 12/0815; G06F 13/4027; G06F 2212/1032
USPC .......................................................... 711/141
See application file for complete search history.

(56) References Cited

U.S. PATENT DOCUMENTS

| | | | |
|---|---|---|---|
| 6,928,520 B2 | 8/2005 | McAllister et al. | |
| 7,774,551 B2 | 8/2010 | Gaither et al. | |
| 8,396,935 B1 * | 3/2013 | Ciurumelea | G06Q 30/0241 709/207 |
| 10,255,189 B2 * | 4/2019 | Bradbury | G06F 12/0828 |
| 11,210,263 B1 * | 12/2021 | Smaldone | G06F 16/172 |
| 2005/0240736 A1 * | 10/2005 | Shaw | G06F 12/0815 711/146 |
| 2007/0055826 A1 * | 3/2007 | Morton | G06F 12/0817 711/E12.027 |
| 2007/0204110 A1 * | 8/2007 | Guthrie | G06F 12/0831 711/146 |
| 2008/0270708 A1 * | 10/2008 | Warner | G06F 12/082 711/146 |
| 2009/0094418 A1 * | 4/2009 | Warner | G06F 12/0831 711/144 |
| 2010/0064108 A1 * | 3/2010 | Harris | G06F 12/0831 711/146 |
| 2010/0235580 A1 * | 9/2010 | Bouvier | G06F 9/5077 711/E12.017 |
| 2012/0124297 A1 * | 5/2012 | Chung | G06F 12/0817 711/E12.001 |
| 2014/0068201 A1 * | 3/2014 | Fromm | G06F 12/0831 711/148 |
| 2014/0129782 A1 * | 5/2014 | Quinn | H04L 67/1097 711/141 |

(Continued)

*Primary Examiner* — Christopher B Shin
(74) *Attorney, Agent, or Firm* — Mueting Raasch Group (57) ABSTRACT

Cache coherency of a global address space of a cache can be maintained with one or more tier control units (TCUs). The global address space of the cache may be shared by multiple domains. Domains may include multiple controllers and a local interconnect operatively coupling the controllers to the cache. The local interconnect of each domain may maintain a cache coherency of a local address space of the cache shared by the controllers of the domain. The one or more TCUs may be operatively coupled to the local interconnects of the domains to maintain the cache coherency of the global address space.

17 Claims, 6 Drawing Sheets

(56) References Cited

U.S. PATENT DOCUMENTS

2015/0363317 A1* 12/2015 Guthrie .............. G06F 12/0833
                                                                    711/128
2017/0308483 A1* 10/2017 Ishii .................... G06F 12/0806
2021/0409506 A1* 12/2021 Radi ....................... H04L 43/16

* cited by examiner

SYSTEMS AND METHODS FOR MAINTAINING CACHE COHERENCY

The present disclosure relates to cache coherency. In particular, the present disclosure relates to maintaining cache coherency in multi-controller architectures.

SUMMARY

Various embodiments of the present disclosure relate to maintaining cache coherency of a cache shared by multiple controllers. Processors that share a cache may be grouped into a plurality of domains. Each domain may include a plurality of controllers operatively coupled to a local interconnect. One or more tier control units may be operatively coupled to the local interconnect of each of the plurality of domains to maintain a cache coherency of an address space of the cache that is shared by the controllers of the plurality of domains.

An exemplary system can include a cache, a plurality of domains, and one or more tier control units. Each of the plurality of domains may include a plurality of controllers and a local interconnect operatively coupling the plurality controllers and the cache to receive and transmit data between the plurality of controllers and the cache, wherein cache coherency of a local address space of the cache shared by the plurality of controllers of the domain is maintained. The one or more tier control units may be operatively coupled to the local interconnect of each of the plurality of domains to maintain cache coherency of a global address space of the cache shared by the plurality of domains.

An exemplary method can include maintaining cache coherency of a global address space of a cache shared by a plurality of domains using one or more tier control units and maintaining cache coherency of a local address space of the cache shared by a plurality of controllers of a domain of the plurality of domains.

An exemplary tier control unit may include a plurality of tier control unit interfaces and one or more logic circuits. Each of the plurality of tier control unit interfaces may include a plurality of inputs to receive cache line requests, responses, and cache line data and a plurality of outputs to transmit cache line requests, responses, and cache line data. The one or more logic circuits may forward cache line requests, responses to cache line requests, and cache line data via one of the plurality of tier control unit interfaces based on one or more of the received cache line requests and responses to cache line requests.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

The present disclosure relates to systems, methods, and processes for maintaining cache coherency of a global address space of a cache (e.g., a level 2 cache, a level 3 cache, main memory, etc.) using one or more tier control units (TCUs). The global address space of the cache may be shared by multiple domains. Domains may include multiple controllers and a local interconnect operatively coupling the controllers to the cache. The local interconnect of each domain may maintain a cache coherency of a local address space of a cache shared by the controllers of the domain. The one or more TCUs may be operatively coupled to the local interconnects of the domains to maintain the cache coherency of the global address space.

Hyphenated reference numerals are used in the figures to identify individual parts or devices. Hyphenated reference numerals include a prefix numeral before the hyphen and a suffix numeral after the hyphen. As used in the specification, hyphenated reference numerals are used to refer to the individual parts or devices whereas use of only the prefix numeral refers to all parts or devices that share the prefix numeral. For example, in FIG. 1, the domains 120-1, 120-2, 120-3, 120-4 may be referred to collectively as domains 120.

Figure 1:
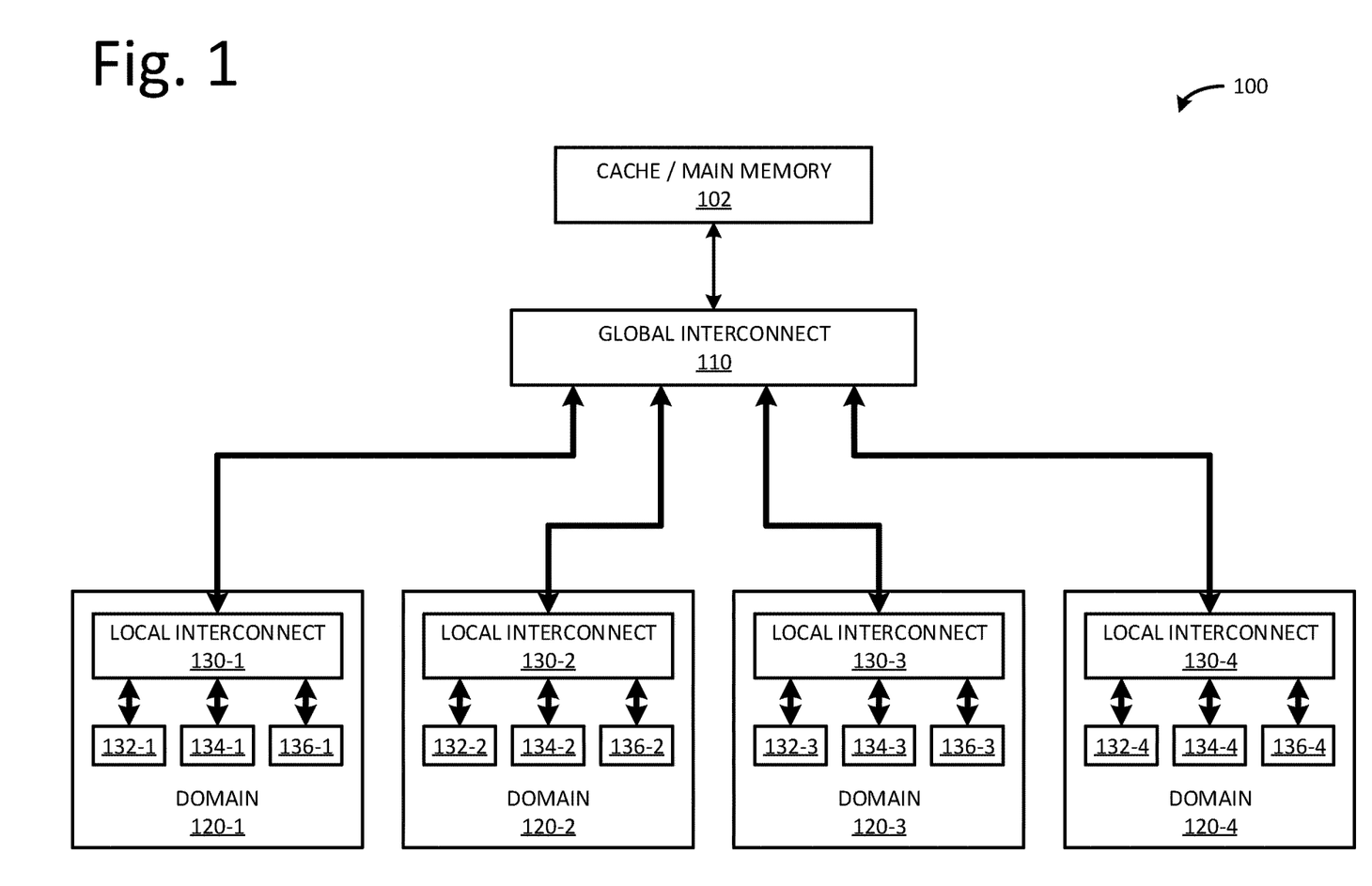
FIG. 1 is a schematic block diagram of an example of a conventional coherent interconnect scheme.
Figure 2:
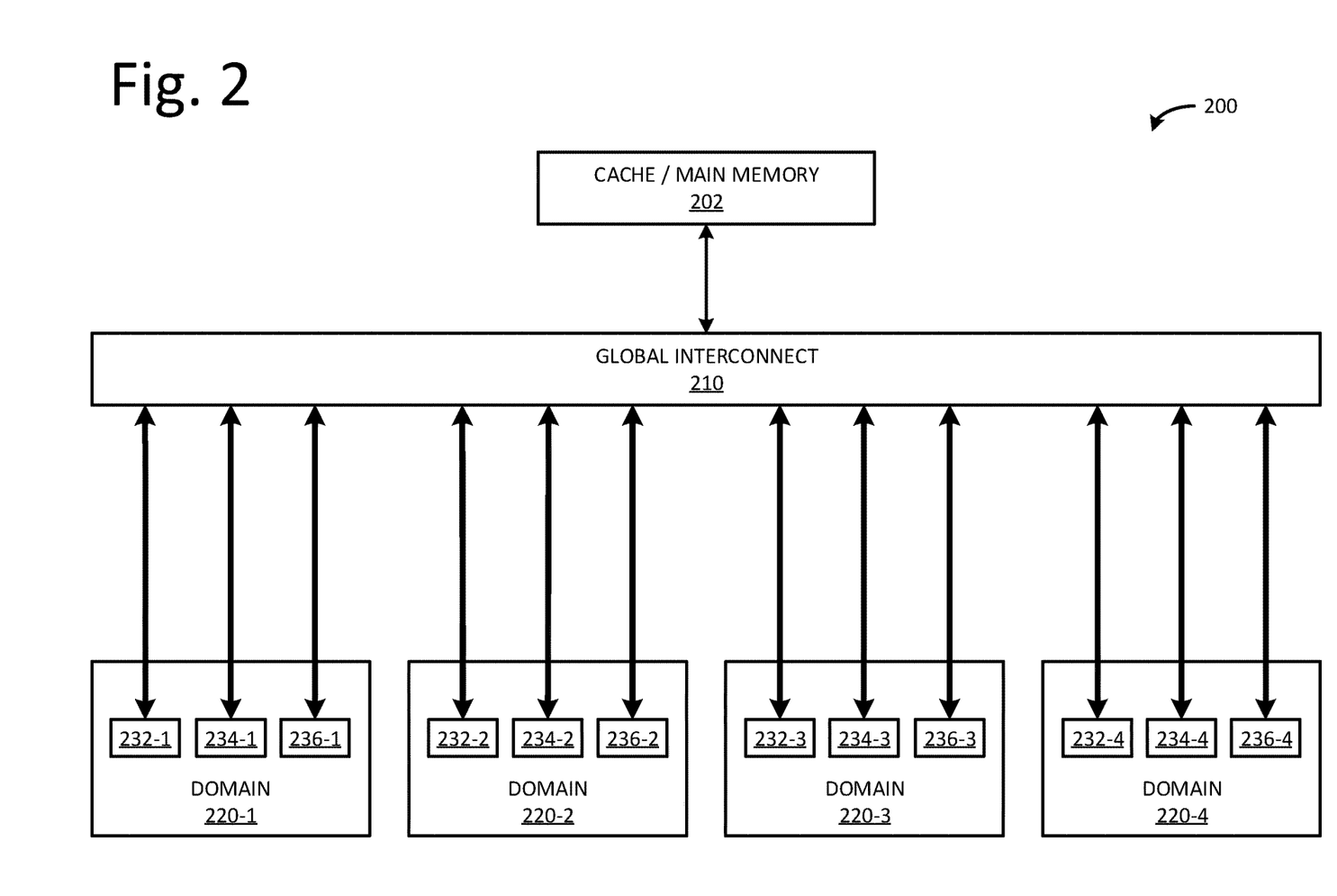
FIG. 2 is a schematic block diagram of another example of a conventional coherent interconnect scheme.

Snoop-based coherent interconnects may be used to maintain cache coherency with multiple controllers (e.g., processors, direct memory access controllers, etc.). Such coherent interconnects may also be used when two controllers are physically spaced apart from one another on the same die. Snoop busses may be driven from a common or global interconnect as depicted in FIGS. 1 and 2. Maintaining cache coherency using a common or global coherent interconnect as shown in FIGS. 1 and 2 may increase the wire lengths, area, power, and wiring congestion in processing units such as, for example, an application-specific integrated circuit (ASIC). For example, in snoop-based coherent interconnects compliant to AXI-4+ACE specifications, snoop busses are driven to all the snoop controllers from a common interconnect. AXI-4+ACE interconnects may include multiple channels to facilitate data transmission and snoop signals such as, for example, read address, read data, write address, write data, write response, snoop address, snoop response, and snoop data channels. The common or global interconnect may increase wire lengths, circuit area, congestion, and timing issues, particularly when controllers are physically spaced apart or arranged in a two-domain coherent interconnect compliant to advanced extensible interface (AXI) specifications. Standard AXI plus AXI Coherency Extensions (ACE) interface signals may be used between domain interconnects (e.g., a local interconnect for each domain) and a global interconnect that maintains cache coherency between two domains. Such an arrangement may also increase circuit area and power consumption.

FIG. 1 shows a schematic block diagram of an example of a conventional coherent interconnect scheme 100. The conventional coherent interconnect scheme 100 includes a cache or main memory 102, a global interconnect 110, and domains 120-1, 120-2, 120-3, 120-4. Each domain of the domains 120 includes multiple controllers 132, 134, 136 and a local interconnect 130. The conventional coherent interconnect scheme 200 may be fabricated as an integrated circuit on a die. The global interconnect 210 may include wires and traces over the face of the die interconnecting various components of the die.

The domain 120-1 includes controllers 132-1, 134-1, 136-1 operatively coupled to a local interconnect 130-1. The domain 120-2 includes controllers 132-2, 134-2, 136-2 operatively coupled to a local interconnect 130-2. The domain 120-3 includes controllers 132-3, 134-3, 136-3 operatively coupled to a local interconnect 130-3. The domain 120-4 includes controllers 132-4, 134-4, 136-4 operatively coupled to a local interconnect 130-4. Each of the local interconnects 130 are operatively coupled to the global interconnect 110. In turn, the global interconnect is operatively coupled to the cache 102

As used herein, "operatively coupled" may include any suitable combination of wired and/or wireless data communication. Wired data communication may include, or utilize, any suitable hardware connection such as, e.g., advanced microcontroller bus architecture (AMBA), ethernet, peripheral component interconnect (PCI), PCI express (PCIe), optical fiber, local area network (LAN), etc. Wireless communication may include, or utilize, any suitable wireless connection such as, e.g., optical, trench bounded photons, Wireless Network-on-Chip (WNoC), etc.

The local interconnects 130 and the global interconnect 110 may be AXI-4+ACE interfaces. Such interconnects provide both local and global cache coherency. However, use of such interconnects for both local and global cache coherency may have a number of disadvantages. For example, snoop requests can be complex to maintain global cache coherency, performance may be limited by the global interconnect 110, the global interconnect 110 may require wide data busses to handle data from each of the controllers 132, 134, 136, and the global interconnect 110 may not support a tiered architecture. Such snoop requests may pertain to a read or write miss of a cache line.

Performance of snoop requests in conventional coherent interconnect schemes such as the conventional coherent interconnect scheme 100 may become complex at the global level because snoop requests in such interconnects needs to be issued to the domain that issued the snoop request in the first place. For example, controller 132-1 may issue a snoop request to store a cache line. The cache line may need to be coherent in domain 120-3. Accordingly, the snoop request may be forwarded to the global interconnect 110; the cache line in domain 120-3 may be invalidated, and the cache lines for controllers 134-1, 136-1 may be invalidated. For proper execution of the snoop request, the local interconnect 130-1 may need to be aware of such snoop request. However, conventional coherent interconnect specifications (e.g., AXI-4+ACE) may not support such a tiered scheme for snoop request associated with storing a cache line.

Furthermore, in conventional coherent interconnect schemes such as the conventional coherent interconnect scheme 100, the global interconnect 110 may be the bottleneck for performance because all the traffic is routed through the global interconnect 110. One alternative, that may allow removal of such bottleneck, may include providing another non-coherent AXI-4 interface operatively coupled to the local interconnects 130 (e.g., for cache-misses of local domains) and the cache 102 while global domain traffic can still be routed to global interconnect. However, such an interconnect scheme may incur additional issues including, cost, wire length, wire area, and timing. Increased wire length and area may incur additional costs in fabricating dies.

Still further, in conventional coherent interconnect schemes such as the conventional coherent interconnect scheme 100, as the number of controllers increases (e.g., exceeding 8 controllers) the interconnect scheme will be required to include wider busses throughout the die. Thus, such an interconnect scheme may have increased area and timing congestion. The increased area may result in the cost of fabricating dies. Increased timing congestion may negatively impact performance of the dies.

FIG. 2 is a schematic block diagram of another example of a conventional coherent interconnect scheme 200. The conventional coherent interconnect scheme 200 includes a cache or main memory 202, a global interconnect 210, and domains 220-1, 220-2, 220-3, 220-4. Each domain of the domains 220 includes multiple controllers 232, 234, 236. The conventional coherent interconnect scheme 200 may be fabricated as an integrated circuit on a die. The global interconnect 210 may include wires and traces over the face of the die interconnecting the various components of the die.

In contrast with the conventional coherent interconnect scheme 100 of FIG. 1, the domains 220 of the conventional coherent interconnect scheme 200 do not include local interconnects. Instead, the controllers 232, 234, 236 are operatively coupled to the global interconnect 210 without a local interconnect in between. In other words, each of the controllers 232, 234, 236 are directly coupled to the global interconnect 210.

The controllers 232, 234, 236 may be operatively coupled to the global interconnect 210 using any suitable coherent interface. In one example, the controllers are connected to the global interconnect 210 via AXI-4+ACE interfaces. Accordingly, the global interconnect 210 may maintain coherency between all of the domains 220.

Similar to the conventional coherent interconnect scheme 100 of FIG. 1, the conventional coherent interconnect scheme 200 may have a number of disadvantages. For example, performance may be limited by the bandwidth of the global interconnect 210 and the global interconnect 210 may include long wires routed throughout the die. Such an arrangement may cause the area of the fabricated circuit to be large and timing congestion may become an issue.

The disadvantages of conventional coherent interconnect schemes (e.g., conventional coherent interconnect schemes 100 and 200 of FIGS. 1 and 2) may be avoided with the use of TCUs. TCUs, as described herein, may reduce circuit area and die size that may allow for a reduction in power consumption and costs. Furthermore, TCUs, as described herein, may allow for a tiered coherency structure that may further reduce circuit area and increase bandwidth.

Figure 3:
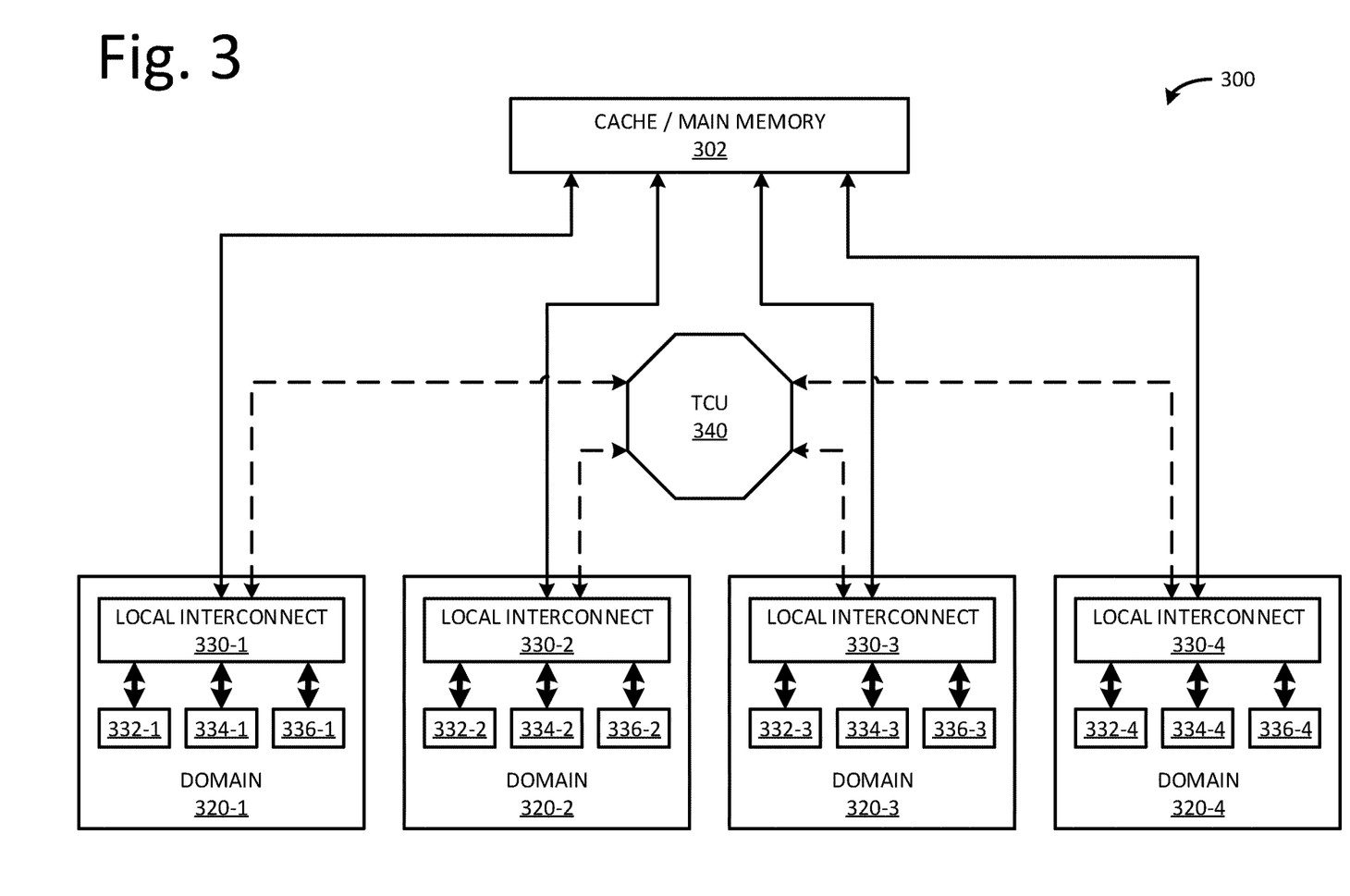
FIG. 3 is a schematic block diagram of an example of a coherent interconnect scheme including a tier control unit.
Figure 4:
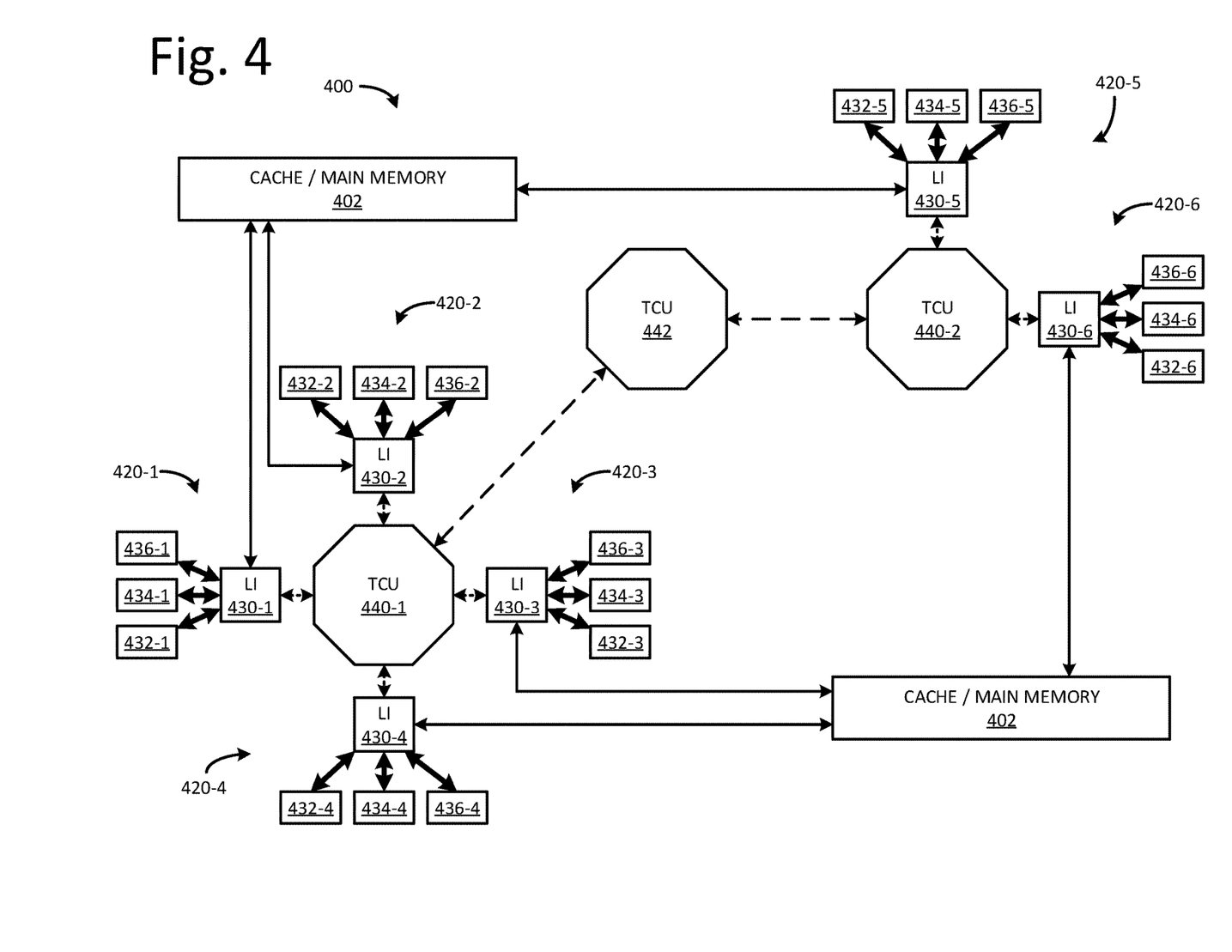
FIG. 4 is a schematic block diagram of an example of a multi-tiered coherent interconnect scheme including tier control units.

Exemplary coherent interconnect schemes 300, 400 using TCUs are depicted in FIGS. 3 and 4. FIG. 3 is a schematic block diagram of an example of a coherent interconnect scheme 300 with a single TCU 340 to maintain cache coherency for a global address space of a cache or main memory 302 shared by all domains 320 of the interconnect. FIG. 4 is a schematic block diagram of an example multi-tiered coherent interconnect scheme 400 with multiple tiers of TCUs to maintain cache coherency for a global address space of a cache or main memory 402 shared by all domains 420 of the interconnect.

The coherent interconnect scheme 300 includes the cache 302, the domains 320, and the TCU 340. Each of the domains 320 may be operatively coupled to the cache 302 and the TCU 340. Each of the domains 320 may include controllers 332, 334, 336 and a local interconnect 330. Although each domain 320 is shown as having three controllers 332, 334, 336, domains of coherent interconnect schemes as described herein may have any suitable number of controllers such as, for example, 1 controller to 64 controllers. The controllers 332, 334, 336 can be implemented as one or more of a multi-core processor, a direct memory access controller, a digital signal processor (DSP), a microprocessor, a programmable controller, a hardware controller, a combined hardware and software device, such as a programmable logic controller, and a programmable logic device (e.g., FPGA, ASIC). The controllers 332, 334, 336 can include or be operatively coupled to memory, such as RAM, SRAM, ROM, or flash memory.

The controllers 332, 334, 336 may be operatively coupled to the local interconnect 330 of their respective domains 320. Each of the local interconnects 330 may be operatively coupled to the cache 302. Each of the domains 320 may have a local address space of the cache 302 that is shared by the controllers 332, 334, 336 of the domain. In other words, a local address spaces may refer to an address space of the ache 302 shared by a single domain. Cache coherency of each of the local address spaces may be maintained.

Each of the local interconnects 330 may be operatively coupled to the controllers 332, 334, 336 of their respective domains 320 and the cache 302. The local interconnects 330 may receive and transmit data between the controllers 332, 334, 336 and the cache 302. In one or more embodiments, each of the local interconnects 330 maintains the cache coherency of the local address space of their respective domain of the domains 320. The local interconnects 330 may include any suitable coherent interconnect, for example, AXI-4+ACE.

The TCU 340 is operatively coupled to the local interconnects 330 of each of the domains 320. In one embodiment, the TCU 340 may be described as a re-usable logic unit that maintains coherency for a global address space of the cache 302 shared between the domains 320. The global address space may include multiple address spaces, each of the address spaces shared by two or more of the domains 320. The TCU 340 may receive cache line requests and responses to maintain cache coherency from the domains 320. Cache line requests may pertain to a cache line of the global address space. The TCU 340 may query one or more domains of the domains 320 based on the cache line request. The domain or domains to query may be determined based on an address space of the cache line of the cache line request. In other words, the TCU 340 may query domains that share an address space of the cache line requests. Cache line requests may pertain to a read or write miss of a cache line.

The TCU 340 may further receive responses to queries. Responses may include an indication of a "hit", a "miss", or an "invalidation acknowledgement." A response of a "hit" indicates that the domain has the cache line of the cache line request. If the response is a hit, the TCU 340 may receive cache line data from the queried domain. A response of a "miss" indicates that the queried domain does not have the cache line of the cache line request. An "invalidation acknowledgement" may indicate that the cache line has been invalidated at the queried domain. The TCU 340 may forward responses to the domain that initiated the cache line request. Additionally, if the TCU 340 receives cache line data the TCU 340 may forward the cache line data to the domain that initiated the cache line request.

In some instances, the TCU 340 may receive multiple cache line requests, responses, or data simultaneously or almost simultaneously (e.g., within the same clock cycle). The TCU 340 may include logic to determine a priority of cache line requests, responses, or data that may be received. Accordingly, the TCU 340 may arbitrate between requests, responses, or data received from multiple sources and determine which item to forward first based on the priorities of the cache line requests. For example, the TCU 340 may receive cache line requests from the domain 320-1 and the domain 320-4 simultaneously or almost simultaneously. The TCU 340 may determine that both cache line requests are to be forwarded to domain 320-2 based on address spaces of the requested cache lines. The TCU 340 may determine which of the two cache line requests has a higher priority and forward the higher priority cache line request first. Priority of a cache line request may be determined based on, for example, the types of the cache line requests, a tier level of the source (e.g., the requesting controller or domain) of the cache line request, etc. In one embodiment, a read cache line request may be a higher priority than an invalidate cache line request.

In some examples, coherent interconnect schemes (e.g., coherent interconnect scheme 400 of FIG. 4) may include multiple TCUs arranged in tiers. Coherent interconnect scheme 400 includes four domains 420-1, 420-2, 420-3, 420-4 arranged similarly to the coherent interconnect scheme 300 depicted in FIG. 3. The four domains 420-1, 420-2, 420-3, 420-4 are operatively coupled to a cache 402 and to a TCU 440-1. The coherent interconnect scheme 400 further includes domains 420-5, 420-6 operatively coupled to another TCU 440-2. The cache 402, domains 420, local interconnects 430, and controllers 432, 434, 436 may include all the features of the cache 302, domains 320, local interconnects 430, and controllers 432, 434, 436 of FIG. 1. In addition to such features, the coherent interconnect scheme 400 further includes TCU 442 operatively coupled to TCU 440-1 and TCU 440-2. Such an arrangement allows the TCUs 442, 440-1, 440-2 to maintain a cache coherency of a global address space of the cache 402 as well as intermediate address spaces of the cache 402.

The global address space of the cache 402 may be an address space of the cache 402 that is shared by all of the domains 420. In contrast, intermediate address spaces may be shared by a subset or a portion of all of the domains 420. One intermediate address space may be an address space of the cache 402 that is shared by the domains 420-1, 420-2, 420-3, 420-4. Another intermediate address space may be an address space of the cache 402 shared by the domains 420-5, 420-6. In other words, one intermediate address space may be an address space of the cache 402 shared by the domains 420 that are operatively coupled to TCU 440-1 and another intermediate address space may be an address space of the cache 402 shared by the domains 420 that are operatively coupled to TCU 440-2. Accordingly, TCU 440-1 may maintain a cache coherency of one intermediate address space and TCU 440-2 may maintain a cache coherency of another intermediate address space.

To maintain the global cache coherency of cache 402, the TCUs 440 may forward cache line requests, responses, and data to TCU 442. The TCUs 440 may be considered tier 1 TCUs and TCU 442 may be considered a tier 2 TCU. Although only two tiers of TCUs are depicted in FIG. 4, coherent interconnect schemes as described herein can include any suitable number of tiers. The number of tiers may be scaled to the number of domains and controllers of the coherent interconnect scheme. The highest tier TCU(s) may maintain a global cache coherency in conjunction with lower tier TCU(s). The cache coherency of intermediate address spaces may be maintained by individual tier 1 TCU(s) or groups of lower tier TCUs based on the specific arrangement of domains and TCUs.

Cache line requests may be propagated to each domain and controller that shares the address space of the cache 402 that the cache line request pertains to or the cache line request may be propagated until a query returns a hit. For example, cache line invalidation requests may be propagated to each domain and controller that shares the address space of the cache 402 that the cache line request pertains to. Further, for example, cache line read requests may be propagated until a query returns a hit.

Cache coherency of a local address space may be maintained at the domain level. In one example, controller 432-1 in domain 420-1 transmits a cache line request for a cache line in the local address space that is only shared with the controllers of domain 420-1. Accordingly, the local interconnect 430-1 queries the other controllers 434-1, 436-1 for the cache line. Thus, cache coherency of the local address spaces may be maintained by the local interconnects 430.

Cache coherency of intermediate address spaces may be maintained by one or more TCUs. In one example, controller 432-1 in domain 420-1 may transmit a cache line request for a cache line in the intermediate address space shared by domains 420-1, 420-2, 420-3, 420-4. In other words, the controller 432-1 may transmit a tier 1 cache line request. The local interconnect 420-1 may query the other controllers 434-1, 436-1 for the cache line and forward the cache line request to TCU 440-1. After receiving the cache line request, TCU 440-1 may query domains 420-2, 420-3, 440-4. In turn, the local interconnects 430.

Cache coherency of a global address space may be maintained by one or more TCUs. In one example, controller 432-1 in domain 420-1 may transmit a cache line request to read a cache line in the global address space shared by all of the domains 420. In this example, the cache line may be present in domain 420-5. The transmitted cache line request may include a tier indicator, for example, indicating a tier 2 cache line request. The tier indicator may be based on the address space of the cache line of the cache line request. The cache line request may be received by the local interconnect 430-1. The local interconnect 430-1 may forward the cache line request to TCU 440-1. TCU 440-1 may forward the request to TCU 442 based on the tier 2 indicator. The TCU 440-1 may forward the cache line request to TCU 442 and the TCU 442 may forward the cache line request to TCU 440-2. The TCU 440-2 may query the domain 420-5 and, because the cache line exists in one of the controllers 432-5, 434-5, 436-5 of domain 420-5, receive a response indicating a hit and the cache line data corresponding to the cache line request. The received cache line data may be forwarded to the controller 432-1 without querying domain 420-6. For example, TCU 440-2 may forward the received cache line data to TCU 442. TCU 442 may receive the cache line data and forward the received cache line data to TCU 440-1. TCU 440-1 may receive the cache line data forward the received cache line data to local interconnect 430-1 without querying domains 420-2, 420-3 and 420-4. The local interconnect 430-1 may forward the received cache line data to 432-1 without querying controllers 436-1 and 434-1.

If a cache line is not present in any domains 420, the local interconnects 430 may retrieve the cache line from the cache 402. Such an arrangement provides an improvement in performance. As shown, the bus lines that operatively couple the controllers 432, 434, 436 to the local interconnects 430 are thicker indicating that the busses are coherent busses. Accordingly, the local interconnects 430 may be able to maintain a cache coherency of the local address spaces. Furthermore, the busses operatively coupling the local interconnects 430 to the cache 402 are thinner indicating non-coherent busses. Non-coherent busses may not include channels used to maintain cache coherency. Thus, the busses operatively coupling the local interconnects 430 to the cache 402 are not used to maintain cache coherency and traffic of such busses are reduced and performance is increased.

In one example, controller 432-1 issues a cache line request and none of the domains 420 have the cache line associated with the cache line request. The local interconnect 430-1 may transmit the cache line request to TCU 440-1 with a tier indicator set to tier 1. TCU 440-1 may query domain 420-2. Because the controllers 432-2, 434-2, 436-2 do not have the cache line of the cache line request, the domain 420-2 may respond with a miss. Subsequently, TCU 440-1 may query the domain 420-3 followed by the domain 420-4. Both domains may respond with a miss because none of the controllers 432-3, 434-3, 436-3, 432-4, 434-4, 436-4 have the cache line. After each of the domains 420-2, 420-3, 420-4 respond to the queries with misses, the TCU 440-1 may transmit a miss response to the domain 420-1. The local interconnect 430-1 may query the controllers 434-1, 436-1 for the cache line and receive miss responses because the controllers 434-1, 436-1 do not have the cache line. Accordingly, the local interconnect 430-1 may retrieve the cache line from the cache 402.

Figure 5:
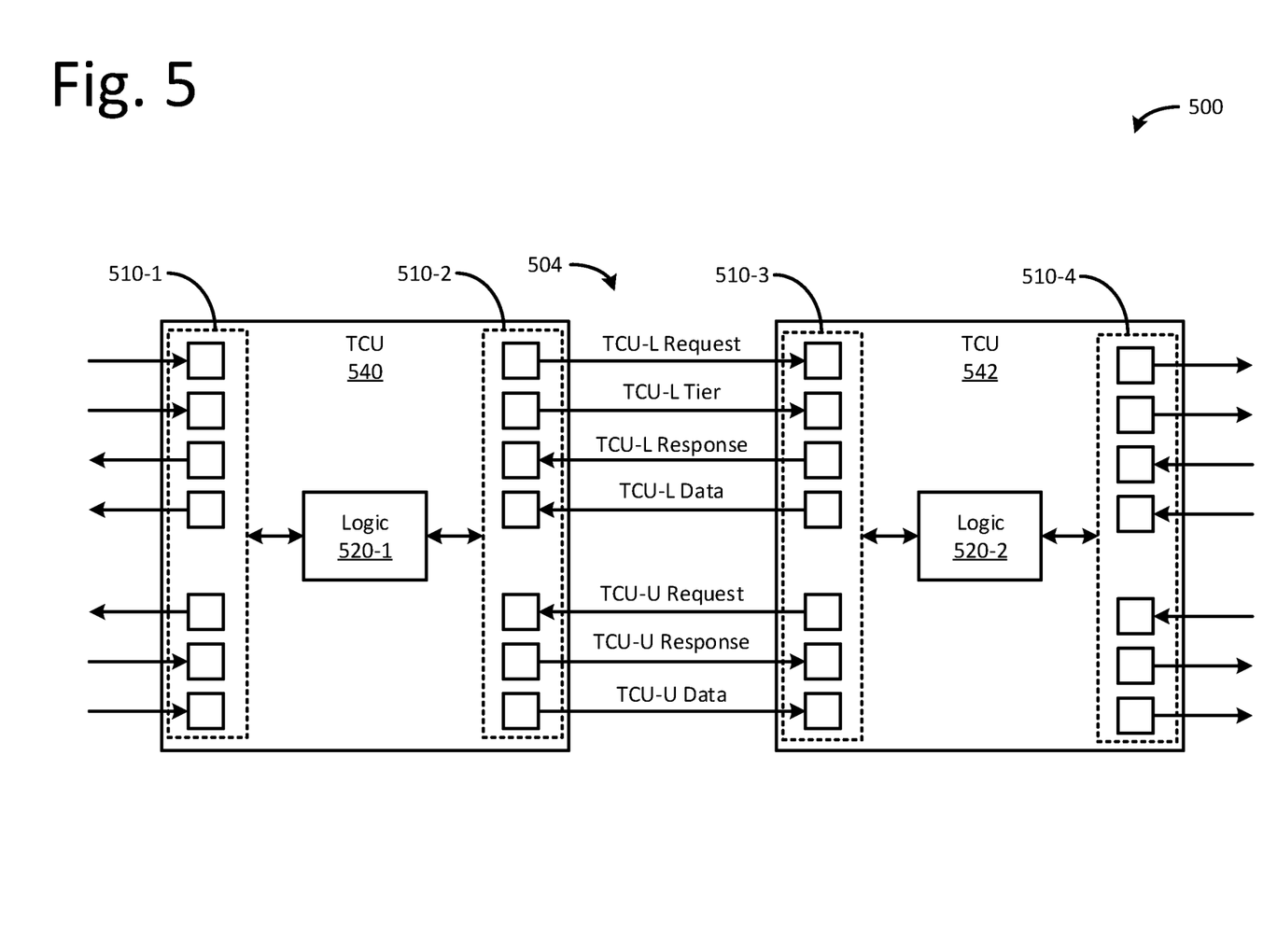
FIG. 5 is a schematic block diagram of an example of a tier control unit interconnect bus.

FIG. 5 is a schematic block diagram 500 of TCUs 540, 542, each including two TCU interfaces 510. As shown, a TCU bus 504 may operatively couple TCU 540 and TCU 542 via TCU interface 510-2, 510-3. In one embodiment, the TCU 540 may be a lower tier TCU and the TCU 542 may be an upper tier TCU. Although the TCU bus 504 as shown operatively couples the two TCUs 540, 542, the TCU bus 504 may be used to operatively couple the TCUs 540, 542 to any suitable device or devices such as, for example, a controller, another interconnect, a memory unit, a domain, etc. The TCU 540 includes a TCU interfaces 510-1, 510-2 and the TCU 542 includes a TCU interfaces 510-3, 510-4.

The TCU interfaces 510 may include various inputs and outputs. The inputs of the TCU interfaces 510 may receive cache line requests, responses, and cache line data. The outputs of the TCU interfaces 510 may transmit cache line requests, responses, and cache line data. The interfaces 510 may further include an input to receive a tier indicator or tier level of a cache line request and an output to transmit the tier indicator. TCU interfaces 510 may be operatively coupled together via a TCU bus 504. The channels of the TCU bus 504 and the TCU interfaces 510 may include, for example, a TCU lower (TCU-L) request channel, a TCU-L tier channel, a TCU-L response channel, a TCU-L data channel, a TCU upper (TCU-U) request channel, a TCU-U response channel, and a TCU-U data channel.

The TCUs 540, 542 may further include one or more logic circuits 520 to receive and forward cache line requests, responses to cache line requests, and cache line data via the TCU interfaces 510. The logic circuits 520 may include any suitable logic or circuits to maintain a cache coherency of a global address space. In one or more embodiments, the logic circuits 520 may include logic gates, look-up tables, etc. The logic circuits 520 may direct or forward cache line requests, queries, responses to cache line requests, and cache line data to an appropriate TCU interface based on an address space of the associated cache line or a tier indicator.

In one or more embodiments, to maintain a cache coherency, the logic circuit 520-1 may receive cache line requests via TCU interface 510-2. In response, the logic circuit 520-1 may transmit a query via TCU interface 510-1 to one or more domains based on the received cache line request. The logic circuit 520-1 may receive a response to the query via the TCU interface 510-1 from the one or more domains. The logic circuit 520-1 may provide or forward a response to the TCU 542 via the TCU interface 510-2. Furthermore, the logic circuit 520-2 may receive the response via TCU interface 510-3 and forward the response via TCU interface 510-4.

In one or more embodiments, to maintain a cache coherency, the logic circuit 520-1 may receive a cache line read request via TCU interface 510-2. The logic circuit 520-1 may transmit a query via TCU interface 510-1 to one or more domains based on the received cache line read request. The logic circuit 520-1 may determine which domains to transmit the query to based on an address space of a cache line associated with the cache line read request or a tier indicator. In response to the query, the logic circuit 520-1 may receive a cache line corresponding to the cache line read request via TCU interface 510-1. The logic circuit 520-1 may transmit the received cache line via the TCU interface 510-2.

In some instances, the logic circuits 520 may receive multiple cache line requests, responses, or data simultaneously or almost simultaneously. The logic circuits 520 may determine which of the multiple cache line requests, responses, or data to forward first. In one or more embodiments, the logic circuit 520-1 may receive multiple cache line requests. The logic circuit 520-1 may determine a priority of each of the received cache line requests. The priority of a cache line request may be based on a tier level, an address space, a type of cache line request (e.g., read cache line request, invalidate cache line request, etc.), etc. The logic circuit 520-1 may forward each of the cache line requests or transmit a query based on the determined priorities.

Figure 6:
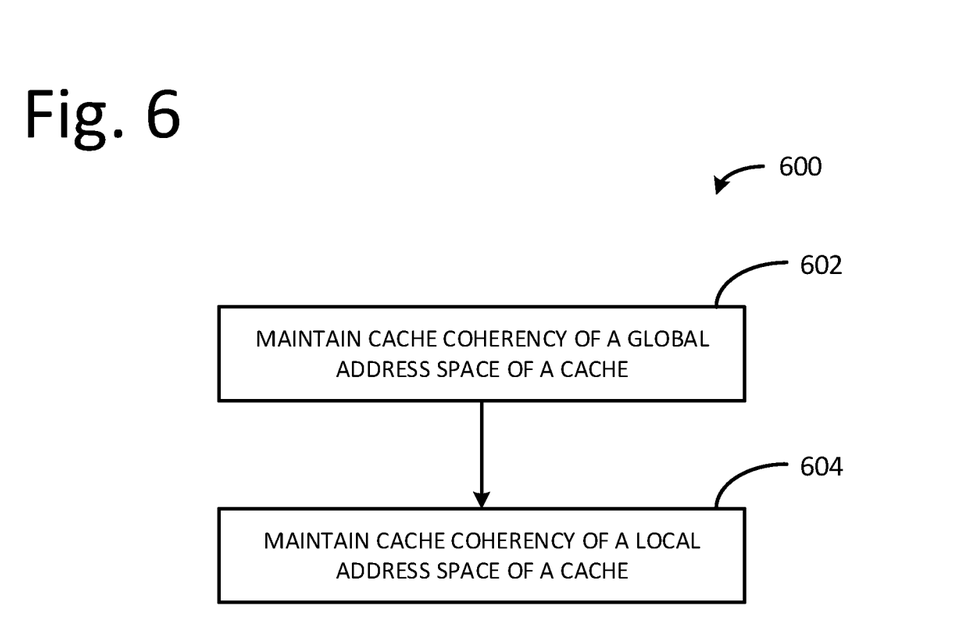
FIG. 6 is a flowchart of an example method in accordance with embodiments of the present disclosure.

An exemplary method, or process 600 for maintaining cache coherency is depicted in FIG. 6. The method 600 may maintain cache coherency of a global address space of a cache shared by a plurality of domains using one or more TCUs 602. The method 600 may further maintain a cache coherency of a local address space of the cache shared by a plurality of controllers of a domain of the plurality of domains 604.

To maintain the cache coherency of the global address space, the method 600 may use the one or more TCUs to receive one or more cache line requests from one or more of the plurality of domains. Cache line requests may include cache line read requests or cache line invalidation requests. Cache line read requests may be a request from a source (e.g., a controller, a domain, etc.) to read the data of a cache line that other domains or controllers may have. Cache line invalidation requests may be an instruction from a source to invalidate a cache line that other domains or controllers may have. A domain or controller has a cache line when the domain or controller has data associated with the address of the cache line stored in a memory of the domain or controller. Cache line requests may include an address in the cache of the cache line and/or a tier indicator or tier level. The method 600 may use the TCU to query another of the plurality of domains based on the received cache line request.

To maintain the cache coherency of the global address space, the method 600 may determine what to do in response to receiving the cache line requests based on the type of cache line request and/or the tier level of the cache line request. If the cache line request is a cache line read request, the method 600 may forward the cache line read request to another TCU or query one or more domains. The method 600 may determine whether to forward the cache line read request based on a tier level or address of the cache line. In one example, the tier level of the cache line read request indicates that the cache line read request should be forwarded to a higher tier. In another example, the tier level indicates that a TCU should query any operatively coupled domains. The method 600 may further determine whether to forward the cache line read request based on whether responses to queries indicate a hit, a miss, or an invalidation acknowledgement. In one example, if a response to a previous query comes back as a hit, propagation of the cache line read request may be terminated and no further queries transmitted. In another example, if a response to a previous query is a miss, additional domains may be queried or the cache line request may be forwarded to another TCU. However, if the cache line request is a cache line invalidation request the cache line request may be propagated to each appropriate domain regardless of the type of response received.

The methods and/or techniques described in this disclosure, including those attributed to the tier control units (TCUs), or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in programs. The term "controller," "module," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, the like, or any combination thereof. The instructions may be executed by one or more processors to support one or more aspects of the functionality described in this disclosure.

The invention is defined in the claims. However, below there is provided a non-exhaustive list of non-limiting examples. Any one or more of the features of these examples may be combined with any one or more features of another example, embodiment, or aspect described herein.

Example Ex1

A system comprising:
a cache;

a plurality of domains, each of the plurality of domains comprising:
  a plurality of controllers; and
  a local interconnect operatively coupling the plurality controllers and the cache to receive and transmit data between the plurality of controllers and the cache, wherein cache coherency of a local address space of the cache shared by the plurality of controllers of the domain is maintained; and
one or more tier control units operatively coupled to the local interconnect of each of the plurality of domains to maintain cache coherency of a global address space of the cache shared by the plurality of domains.

Example Ex2

The system of example Ex1, wherein, to maintain cache coherency of the global address space of the cache, the one or more tier control units are configured to:
receive one or more cache line requests from a requesting domain of the plurality of domains;
query another of the plurality of domains based on the received cache line request;
receive a response to the query; and
provide a response to the requesting domain of the plurality of domains based on the received response to the query.

Example Ex3

The system of example Ex1, wherein the local interconnect of each of the plurality of domains is operatively coupled to the cache via a non-coherent interconnect and the one or more tier control units are operatively coupled to the local interconnect of each of the plurality of domains via a tier control unit interface (TCU IF).

Example Ex4

The system of example Ex1, wherein the one or more tier control units comprises:
a first tier group operatively coupled to the local interconnect each of the plurality of domains, the first tier group comprising one subset of the one or more tier control units; and
a second tier group operatively coupled to the first tier group, the second tier group comprising another subset of the one or more tier control units, wherein an intersection of the one subset and the other subset is an empty set.

Example Ex5

The system of example Ex1, wherein the one or more tier control units are operatively coupled to the local interconnect of each of the plurality of domains via a tier control unit interface (TCU IF) comprising:
a request channel to receive cache line requests;
a tier channel to receive a tier level of the cache line requests;
a response channel to provide a response to the cache line requests; and
a data channel to provide cache line data.

Example Ex6

The system of example Ex1, wherein, to maintain cache coherency of the global address space of the cache, the one or more tier control units are configured to:
receive a cache line read request from a requesting domain of the plurality of domains;
query another of the plurality of domains based on the received cache line read request;
receive a cache line corresponding to the cache line read request in response to the query; and
transmit the received cache line to the requesting domain of the plurality of domains.

Example Ex7

The system of example Ex1, wherein the local interconnect of each of the domains is configured to:
transmit a cache line read request to the one or more tier control units;
receive a response to the cache line read request; and
retrieve cache line data corresponding to the cache line read request from the cache in response to the received cache line read request being a miss.

Example Ex8

The system of example Ex1, wherein, to maintain cache coherency of the global address space of the cache, the one or more tier control units are configured to:
determine a priority of a plurality of cache line requests received; and
forward each of the plurality of cache line requests or transmit a query based on the determined priority.

Example Ex9

A method comprising:
maintaining cache coherency of a global address space of a cache shared by a plurality of domains using one or more tier control units; and
maintaining cache coherency of a local address space of the cache shared by a plurality of controllers of a domain of the plurality of domains.

Example Ex10

The method of example Ex9, wherein maintaining cache coherency of the global address space of the cache comprises:
receiving one or more cache line requests from one of the plurality of domains using the one or more tier control units;
querying another of the plurality of domains based on the received cache line request using the one or more tier control units;
receiving a response to the query using the one or more tier control units; and
providing a response to the one of the plurality of domains based on the received response to the query using the one or more tier control units.

Example Ex11

The method of example Ex9, wherein maintaining cache coherency of the global address space of the cache comprises:
receiving a cache line read request from one of the plurality of domains using the one or more tier control units;
querying another of the plurality of domains based on the received cache line read request using the one or more tier control units;

receiving a cache line corresponding to the cache line read request in response to the query; and transmitting the received cache line to the one of the one or more tier control units.

Example Ex12

The method of example Ex9, wherein maintaining cache coherency of the global address space of the cache comprises:

transmitting a cache line read request to the one or more tier control units using a local interconnect of one of the plurality of domains;

receiving a response to the cache line read request using the local interconnect; and retrieving cache line data corresponding to the cache line read request from the cache using the local interconnect in response to the received cache line read request being a miss.

Example Ex13

The method of example Ex9, wherein maintaining cache coherency of the global address space of the cache comprises:

determining a priority of a plurality of cache line requests received using the one or more tier control units; and forwarding each of the plurality of cache line requests or transmitting a query using the one or more tier control units based on the determined priority.

Example Ex14

A tier control unit comprising:

a plurality of tier control unit interfaces, each of the plurality of tier control unit interfaces comprising:
  a plurality of inputs to receive cache line requests, responses, and cache line data; and
  a plurality of outputs to transmit cache line requests, responses, and cache line data; and
one or more logic circuits to forward cache line requests, responses to cache line requests, and cache line data via one of the plurality of tier control unit interfaces based on one or more of the received cache line requests and responses to cache line requests.

Example Ex15

The tier control unit of example Ex14, wherein the plurality of tier control unit interfaces comprises a tier control unit interface to transmit cache line requests, responses, and cache line data to a domain and to receive cache line requests, responses, and cache line data from the domain.

Example Ex16

The tier control unit of example Ex14, wherein the plurality of tier control unit interfaces comprises a tier control unit interface to transmit cache line requests, responses, and cache line data to another tier control unit and to receive cache line requests, responses, and cache line data from the other tier control unit.

Example Ex17

The tier control unit of example Ex14, wherein the one or more logic circuits are configured to:

receive one or more cache line requests via a tier control unit interface of the plurality of tier control unit interfaces;

transmit a query via another tier control unit interface of the plurality of tier control unit interfaces based on the received cache line request;

receive a response to the query via the other control unit interface of the plurality of tier control unit interfaces; and provide a response via the tier control unit interface of the plurality of tier control unit interfaces based on the received response to the query Example Ex18

The tier control unit of example Ex14, wherein the one or more logic circuits are configured to:

receive a cache line read request via a tier control unit interface of the plurality of tier control unit interfaces;

transmit a query via another tier control unit interface of the plurality of tier control unit interfaces based on the received cache line read request;

receive a cache line corresponding to the cache line read request in response to the query via the other of the plurality of tier control unit interfaces; and transmit the received cache line via the tier control unit interface of the plurality of tier control unit interfaces.

Example Ex19

The tier control unit of example Ex14, wherein the one or more logic circuits are configured to:

determine a priority of a plurality of cache line requests received; and forward each of the plurality of cache line requests or transmit a query based on the determined priority.

Example Ex20

The tier control unit of example Ex14, wherein one of the plurality of tier control unit interfaces comprises an input to receive a tier level and another of the plurality of tier control unit interfaces comprises an output to provide the tier level.

Example Ex21

The system of example Ex1, wherein, to maintain cache coherency of the global address space of the cache, the one or more tier control units are configured to:

receive a cache line invalidate request from a requesting domain of the plurality of domains;

query another of the plurality of domains based on the received cache line invalidate request;

receive an invalidation acknowledgement of the invalidation request; and transmit the received invalidation acknowledgement to the requesting domain of the plurality of domains.

Example Ex22

The system of example Ex1, wherein the local interconnect of each of the domains is configured to:

transmit a cache line invalidate request to the one or more tier control units; and receive a response to the cache line invalidate request.

Example Ex23

The method of example Ex9, wherein maintaining cache coherency of the global address space of the cache comprises:

receiving a cache line invalidate request from one of the plurality of domains using the one or more tier control units;

querying another of the plurality of domains based on the received cache line invalidate request using the one or more tier control units;

receiving an invalidation acknowledgement of the cache line invalidate request in response to the query; and transmitting the received invalidation acknowledgement to the one of the one or more tier control units.

Example Ex24

The method of example Ex9, wherein maintaining cache coherency of the global address space of the cache comprises:

transmitting a cache line invalidate request to the one or more tier control units using a local interconnect of one of the plurality of domains; and receiving a response to the cache line invalidate request using the local interconnect.

Example Ex25

The tier control unit of example Ex14, wherein the one or more logic circuits are configured to:

receive a cache line invalidate request via a tier control unit interface of the plurality of tier control unit interfaces;

transmit a query via another tier control unit interface of the plurality of tier control unit interfaces based on the received cache line invalidate request;

receive an invalidation acknowledgement corresponding to the cache line invalidate request in response to the query via the other of the plurality of tier control unit interfaces; and transmit the received invalidation acknowledgement via the tier control unit interface of the plurality of tier control unit interfaces.

Thus, various embodiments of SYSTEMS AND METHODS FOR MAINTAINING CACHE COHERENCY are disclosed. Although reference is made herein to the accompanying set of drawings that form part of this disclosure, one of at least ordinary skill in the art will appreciate that various adaptations and modifications of the embodiments described herein are within, or do not depart from, the scope and spirit of this disclosure. For example, aspects of the embodiments described herein may be combined in a variety of ways with each other. Therefore, it is to be understood that, within the scope of the appended claims, the claimed invention may be practiced other than as explicitly described herein.

It will be apparent to one skilled in the art that elements or processes from one embodiment may be used in combination with elements or processes of the other embodiments, and that the possible embodiments of such systems, apparatus, devices, and methods using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or sizes, or types of elements, may be advantageous over others.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a," "an," and "the" encompass embodiments having plural referents, unless the content clearly dictates otherwise. As used in this specification and the appended claims, the term "or" is generally employed in its non-exclusive sense meaning "and/or" unless the content clearly dictates otherwise.

As used herein, "have," "having," "include," "including," "comprise," "comprising" or the like are used in their open ended sense, and generally mean "including, but not limited to". It will be understood that "consisting essentially of," "consisting of," and the like are subsumed in "comprising," and the like.

The phrases "at least one of," "comprises at least one of," and "one or more of" followed by a list refers to any one of the items in the list and any combination of two or more items in the list.

What is claimed is:

1. A system comprising:
    a cache;
    a plurality of domains, each of the plurality of domains comprising:
        a plurality of controllers; and
        a local interconnect operatively coupling the plurality of controllers and the cache to receive and transmit data between the plurality of controllers and the cache, wherein cache coherency of a local address space of the cache shared by the plurality of controllers of the domain is maintained using the local interconnect; and
    one or more tier control units comprising one or more logic circuits and operatively coupled to the local interconnect of each of the plurality of domains to maintain cache coherency of a global address space of the cache shared by the plurality of domains, wherein, to maintain cache coherency of the global address space of the cache, the one or more tier control units are configured to:
        receive one or more cache line requests from a requesting domain of the plurality of domains;
        query another of the plurality of domains based on the received cache line request receive a response to the query; and
        provide a response to the requesting domain of the plurality of domains based on the received response to the query.

2. The system of claim 1, wherein the local interconnect of each of the plurality of domains is operatively coupled to the cache via a non-coherent interconnect and the one or more tier control units are operatively coupled to the local interconnect of each of the plurality of domains via a tier control unit interface (TCU IF).

3. The system of claim 1, wherein the one or more tier control units comprises:
a first tier group operatively coupled to the local interconnect of each of the plurality of domains, the first tier group comprising one subset of the one or more tier control units; and
a second tier group operatively coupled to the first tier group, the second tier group comprising another subset of the one or more tier control units, wherein an intersection of the one subset and the other subset is an empty set.

4. The system of claim 1, wherein the one or more tier control units are operatively coupled to the local interconnect of each of the plurality of domains via a tier control unit interface (TCU IF) comprising:
a request channel to receive cache line requests;
a tier channel to receive a tier level of the cache line requests;
a response channel to provide a response to the cache line requests; and
a data channel to provide cache line data.

5. The system of claim 1, wherein, to maintain cache coherency of the global address space of the cache, the one or more tier control units are configured to:
receive a cache line read request from a requesting domain of the plurality of domains;
query another of the plurality of domains based on the received cache line read request;
receive a cache line corresponding to the cache line read request in response to the query; and
transmit the received cache line to the requesting domain of the plurality of domains.

6. The system of claim 1, wherein the local interconnect of each of the domains is configured to:
transmit a cache line read request to the one or more tier control units;
receive a response to the cache line read request; and
retrieve cache line data corresponding to the cache line read request from the cache in response to the received cache line read request being a miss.

7. The system of claim 1, wherein, to maintain cache coherency of the global address space of the cache, the one or more tier control units are configured to:
determine a priority of a plurality of cache line requests received; and
forward each of the plurality of cache line requests or transmit a query based on the determined priority.

8. A method comprising:
maintaining cache coherency of a global address space of a cache shared by a plurality of domains using one or more tier control units comprising one or more logic circuits and operatively coupled to a local interconnect of each of the plurality of domains to maintain cache coherency of the global address space, wherein maintaining cache coherency of the global address space of the cache comprises:
receiving one or more cache line requests from one of the plurality of domains using the one or more tier control units;
querying another of the plurality of domains based on the received cache line request using the one or more tier control units;
receiving a response to the query using the one or more tier control units; and
providing a response to the one of the plurality of domains based on the received response to the query using the one or more tier control units; and
maintaining cache coherency of a local address space of the cache shared by a plurality of controllers of a domain of the plurality of domains using the local interconnect of the domain.

9. The method of claim 8, wherein maintaining cache coherency of the global address space of the cache comprises:
receiving a cache line read request from one of the plurality of domains using the one or more tier control units;
querying another of the plurality of domains based on the received cache line read request using the one or more tier control units;
receiving a cache line corresponding to the cache line read request in response to the query; and
transmitting the received cache line to the one of the one or more tier control units.

10. The method of claim 8, wherein maintaining cache coherency of the global address space of the cache comprises:
transmitting a cache line read request to the one or more tier control units using the local interconnect of one of the plurality of domains;
receiving a response to the cache line read request using the local interconnect of the one of the plurality of domains; and
retrieving cache line data corresponding to the cache line read request from the cache using the local interconnect of the one of the plurality of domains in response to the received cache line read request being a miss.

11. The method of claim 8, wherein maintaining cache coherency of the global address space of the cache comprises:
determining a priority of a plurality of cache line requests received using the one or more tier control units; and
forwarding each of the plurality of cache line requests or transmitting a query using the one or more tier control units based on the determined priority.

12. A tier control unit comprising:
a plurality of tier control unit interfaces, each of the plurality of tier control unit interfaces comprising:
a plurality of inputs to receive cache line requests, responses, and cache line data;
a plurality of outputs to transmit cache line requests, responses, and cache line data; and
one or more logic circuits to forward cache line requests, responses to cache line requests, and cache line data via one of the plurality of tier control unit interfaces based on one or more of the received cache line requests and responses to cache line requests, the one or more logic circuits configured to:
receive one or more cache line requests via a tier control unit interface of the plurality of tier control unit interfaces;
transmit a query via another tier control unit interface of the plurality of tier control unit interfaces based on the received cache line request;
receive a response to the query via the other tier control unit interface of the plurality of tier control unit interfaces; and provide a response via the tier control unit interface of the plurality of tier control unit interfaces based on the received response to the query.

13. The tier control unit of claim 12, wherein the plurality of tier control unit interfaces comprises a tier control unit interface to transmit cache line requests, responses, and cache line data to a domain and to receive cache line requests, responses, and cache line data from the domain.

14. The tier control unit of claim 12, wherein the plurality of tier control unit interfaces comprises a tier control unit interface to transmit cache line requests, responses, and cache line data to another tier control unit and to receive cache line requests, responses, and cache line data from the other tier control unit.

15. The tier control unit of claim 12, wherein the one or more logic circuits are configured to:

receive a cache line read request via a tier control unit interface of the plurality of tier control unit interfaces;

transmit a query via another tier control unit interface of the plurality of tier control unit interfaces based on the received cache line read request;

receive a cache line corresponding to the cache line read request in response to the query via the other tier control unit interface of the plurality of tier control unit interfaces; and transmit the received cache line via the tier control unit interface of the plurality of tier control unit interfaces.

16. The tier control unit of claim 12, wherein the one or more logic circuits are configured to:

determine a priority of a plurality of cache line requests received; and forward each of the plurality of cache line requests or transmit a query based on the determined priority.

17. The tier control unit of claim 12, wherein one of the plurality of tier control unit interfaces comprises an input to receive a tier level and another of the plurality of tier control unit interfaces comprises an output to provide the tier level.

* * * * *